United States Patent
Burgoon et al.

(10) Patent No.: US 12,325,722 B2
(45) Date of Patent: Jun. 10, 2025

(54) PROCESS FOR THE PREPARATION OF HIGH PURITY NORBORNENE SILYL ETHERS

(71) Applicant: PROMERUS, LLC, Akron, OH (US)

(72) Inventors: Hugh Burgoon, Akron, OH (US); J. Alex Niemiec, Akron, OH (US); Doug Skilskyj, Akron, OH (US); Larry F. Rhodes, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 0 days.

(21) Appl. No.: 18/605,925

(22) Filed: Mar. 15, 2024

(65) Prior Publication Data

US 2024/0309025 A1    Sep. 19, 2024

Related U.S. Application Data

(60) Provisional application No. 63/452,364, filed on Mar. 15, 2023.

(51) Int. Cl.
*C07F 7/18*    (2006.01)

(52) U.S. Cl.
CPC .................... *C07F 7/188* (2013.01)

(58) Field of Classification Search
CPC ........ C07F 7/188; C07F 7/1804; C07F 5/025; C07F 7/083
See application file for complete search history.

(56) References Cited

U.S. PATENT DOCUMENTS 9,382,271 B2 * 7/2016 Bell ........................ B01J 31/04
2002/0128408 A1    9/2002 Goodall et al.
2015/0291634 A1    10/2015 Bell et al.

FOREIGN PATENT DOCUMENTS

WO    WO 2004/076495 A2    9/2004

OTHER PUBLICATIONS

Blackwell (J. Org. Chem. 1999, 64, 4887-4892).*
Andreyanov (Polymer; 256, 2022, 125169, pp. 1-11 with supplementary data).*
Andreyanov, F. A. et al., "Polymers from organosilicon derivatives of 5-norbornene-2-methanol for membrane gas separation," Polymer, 2022, vol. 256, Article No. 125169 (pp. 1-11).
Wang, X. et al., "Copolymerization of 5-norbornene-2-metheneoxy-trimethylsilyl with methyl 5-norbornene-2-carboxylate catalyzed by a novel Ni(benzocyclohexan-ketonaphthylimino)2/B(C6F5)3) system," J. Polym. Eng., 2012, vol. 32, pp. 415-423.
Written Opinion of the PCT/US2024/020052, Jul. 15, 2024.

* cited by examiner

*Primary Examiner* — Pancham Bakshi
(74) *Attorney, Agent, or Firm* — Balaram Gupta

(57) ABSTRACT

A process for the preparation of high purity norbornene alkyl silyl ether is disclosed and claimed. Specifically, a process for the preparation of industrial scale high purity norbornene methyl silyl ether is disclosed and claimed. The high purity monomers prepared in accordance with the process of this invention are useful in a variety of applications including but not limited to the preparation of high quality and high purity polynorbornenes having utility in a variety of electronic applications, among various other applications.

12 Claims, No Drawings

PROCESS FOR THE PREPARATION OF HIGH PURITY NORBORNENE SILYL ETHERS

CROSS REFERENCE TO RELATED APPLICATIONS

This application claims the benefit of U.S. Provisional Application No. 63/452,364, filed Mar. 15, 2023, which is incorporated herein by reference in its entirety.

BACKGROUND OF THE INVENTION

Field of the Invention

Embodiments of the present invention relate to an industrial scale process for the preparation of a variety of norbornene silyl ethers. More specifically, it relates to a process for the preparation of high purity norbornene alkyl silyl ethers, which are useful as monomers in a variety of industrial applications including as starting materials in the manufacture of electronic/optoelectronic polymeric materials.

Description of the Art

Functionalized norbornene monomers are extensively used in the preparation of polymers having a wide variety of applications, especially in the electronic industry. In particular, various electronic materials utilize polynorbornenes because of their unique film forming properties supplemented with desirable electronic material properties. Such applications include, among others, their use as dielectrics, photoresists and protective layers. However, as these applications require very high purity materials, it is particularly important that various functionalized norbornene monomers are free of any impurity that might make it difficult to form high molecular weight polymers.

U.S. Pat. No. 9,382,271 B2 discloses a process for the preparation of a variety of norbornene alkyl silyl ether monomers. However, the process disclosed therein needs a stoichiometric amounts of base, such as potassium tert-butoxide, thus generating large amounts of waste. Therefore, such a process is not industrially friendly and involves significant amount of cost due to waste management.

In view of the foregoing, there is a need to develop industrially viable processes to prepare high purity norbornene alkyl silyl ether monomers, which are environmentally friendly.

Other objects and further scope of the applicability of the present invention will become apparent from the detailed description that follows.

SUMMARY OF THE INVENTION

A process for the preparation of high purity norbornene alkyl silyl ether of formula (I) is disclosed as further described hereinbelow. Specifically, a process for the preparation of industrial scale high purity norbornene methyl silyl ether is disclosed. Surprisingly, catalytic amounts of tris(pentafluorophenyl)borane facilitates the reaction of norbornene alkanols of formula (II) with a silane of formula (III) as described herein. The high purity norbornene alkyl silyl ether monomers of formula (I) prepared in accordance with the process of this invention are useful in a variety of applications including but not limited to the preparation of high quality and high purity polynorbornenes having utility in a variety of electronic applications, among various other applications.

DETAILED DESCRIPTION OF THE INVENTION

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

As used herein, the expression "heterocycle" includes all of the known reduced heteroatom containing cyclic radicals. Representative 5-membered heterocycle radicals include tetrahydrofuranyl, tetrahydrothiophenyl, pyrrolidinyl, 2-thiazolinyl, tetrahydrothiazolyl, tetrahydrooxazolyl, and the like. Representative 6-membered heterocycle radicals include piperidinyl, piperazinyl, morpholinyl, thiomorpholinyl, and the like. Various other heterocycle radicals include, without limitation, aziridinyl, azepanyl, diazepanyl, diazabicyclo[2.2.1]hept-2-yl, and triazocanyl, and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of ($C_1$-$C_6$)alkyl, ($C_2$-$C_6$)alkenyl, ($C_1$-$C_6$)perfluoroalkyl, phenyl, hydroxy, —$CO_2H$, an ester, an amide, ($C_1$-$C_6$) alkoxy, ($C_1$-$C_6$)thioalkyl and ($C_1$-$C_6$)perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

Thus, in accordance with the practice of this invention there is provided a process for the preparation of a compound of formula (I):

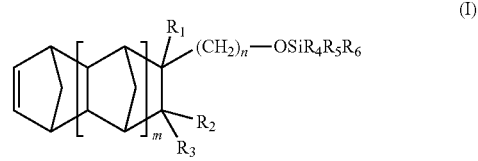

(I)

wherein
n is an integer from 1 to 10, inclusive, and where one or more of $CH_2$ is optionally substituted with ($C_1$-$C_{10}$) alkyl or ($C_1$-$C_{10}$)perfluoroalkyl;
m is an integer from 0 to 2, inclusive;
$R_1$, $R_2$ and $R_3$ are the same or different and independently of each other selected from the group consisting of hydrogen, halogen, methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl ($C_1$-$C_3$)alkyl, ($C_5$-$C_{10}$)heteroaryl, ($C_5$-$C_{10}$)heteroaryl ($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_5$-$C_{10}$)heteroaryloxy($C_1$-$C_3$)alkyl, ($C_6$-$C_{10}$)aryloxy, ($C_5$-$C_{10}$)heteroaryloxy and ($C_1$-$C_6$)acyloxy;
$R_4$, $R_5$ and $R_6$ are the same or different and independently of each other selected from the group consisting of methyl, ethyl or linear or branched ($C_3$-$C_{12}$)alkyl and substituted or unsubstituted ($C_6$-$C_{14}$)aryl;
comprising:
placing a solution of tris(pentafluorophenyl)borane in a suitable reactor under inert atmosphere;
adding to the above solution a compound of formula (II):

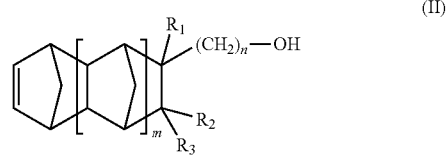

(II)

and a silane of formula (III):

$R_4R_5R_6SiH$ (III)

simultaneously over a period of about 10 minutes to about 120 minutes at a temperature from about 40° C. to about 90° C.;
allowing the reaction mixture to react for an additional period of at least about 15 minutes;
cooling the reaction mixture to room temperature and treating with an aqueous solution of a base selected from the group consisting of lithium carbonate, lithium bicarbonate, sodium carbonate, sodium bicarbonate, potassium carbonate, potassium bicarbonate, ammonium hydroxide, tetramethyl ammonium hydroxide and pyridine; and
distilling the reaction mixture under vacuum at a temperature of from about 130° C. to about 170° C. to obtain the compound of formula (I).

Surprisingly, it has now been found that a metered addition of a mixture containing essentially equimolar amounts of a compound of formula (II) and a compound of formula (III) to a solution containing catalytic amounts of tris(pentafluorophenyl)borane it is now possible to obtain compounds of formula (I) in quantitative yields and of high purity, as summarized in Scheme I.

Scheme I

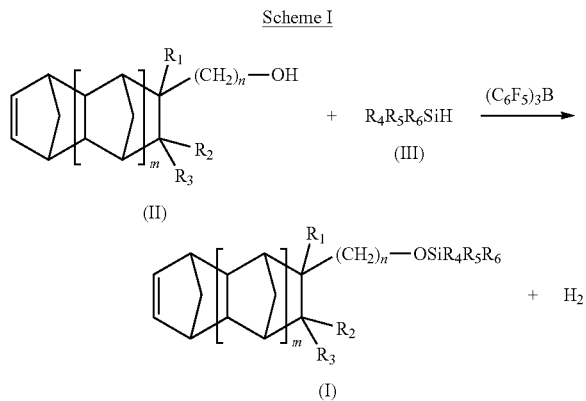

It should be noted that various other Lewis acid catalysts similar in nature to that of tris(pentafluorophenyl)borane can also be used as a catalyst in the process of this invention. AS used herein, "Lewis acid" is any substance that will take up an electron pair to form a covalent bond. That is, an electron-pair acceptor. Exemplary such Lewis acids that may be enumerated include but are not limited to tris(2,4,6-trifluorophenyl)borane, tris(2,6-difluorophenyl)borane, tris(4-fluorophenyl)borane, tris(4-trifluoromethylphenyl)borane, and the like.

Generally, it is advantageous to use a Lewis acid which is also soluble in the solvent which are miscible or compatible with compounds of formulae (II) and (III) so as to bring about the intended reaction as contemplated in Scheme I. Accordingly, Lewis acid of formula (IV) is a suitable Lewis acid that can be employed in the process of this invention.

Where, M is selected from the group consisting of boron, aluminum, gallium, indium and thallium; $R_7$ is independently the same or different and represent a substituted monovalent $(C_6-C_{14})$aryl, where it is substituted with at least one electron-withdrawing group selected from the group consisting of —$CF_3$, —$NO_2$, —CN and halogen; X is halogen; x is an integer from 1 to 3, inclusive; and y is an integer 0 to 3, inclusive, with the proviso that x+y=3. In some embodiments $R_7$ is substituted with at least two halogens. In some other embodiments the Lewis acid that is suitable in the process of this invention is represented by formula (V):

Wherein each $R_8$ is independently the same or different and represent a substituted monovalent $(C_6-C_{14})$aryl, where it is substituted with at least one electron-withdrawing group selected from the group consisting of —$CF_3$, —$NO_2$, —CN and halogen; X is halogen; x is an integer from 1 to 3, inclusive; and y is an integer 0 to 3, inclusive, with the proviso that x+y=3. In some embodiments $R_7$ is substituted with at least two halogens.

Advantageously, it has now been found that tris(pentafluorophenyl)borane provides good catalytic activity in the preparation of compounds of formula (I). As noted, the amounts of tris(pentafluorophenyl)borane employed are in catalytic quantities, thus requiring minimal efforts in purification of the final product. The amount of tris(pentafluorophenyl)borane that can be employed generally depends upon the type of compound of formula (I) that is being prepared. In general, the amount of tris(pentafluorophenyl)borane employed is less than or equal to 0.1 mole percent based on the moles of a compound of formula (II) employed. That is to say that the molar ratio of compound of formula (II):tris(pentafluorophenyl)borane is generally 2,000:≤2. In some other embodiments the molar ratio of compound of formula (II):tris(pentafluorophenyl)borane is generally about 2,000:1. That is to say that the mole percent of tris(pentafluorophenyl)borane is about 0.05 mole percent based on the moles of compound of formula (II) employed. Accordingly, in some embodiments lower than 0.1 mole percent, such as for example 0.05 mole percent, 0.001 mole percent or lower mole percent of tris(pentafluorophenyl)borane can be employed in order to obtain higher purity compound of formula (I). Similarly, in some other embodiments higher than 0.2 mole percent of tris(pentafluorophenyl)borane can be employed depending upon the type of compound of formula (I) that is being prepared. All such variations of catalytic amounts of tris(pentafluorophenyl)borane employed are within the scope of the inventive process of this invention.

By practicing the inventive process conditions of this invention it is now possible to prepare a compound of formula (I) which is of high purity. As used herein "high purity" means the product independent of other impurities. Accordingly, in some embodiments the compound of formula (I) prepared in accordance of this invention is of at least 99 percent purity. In some other embodiments the compound of formula (I) is of at least 99.5 percent purity. In yet other embodiments the compound of formula (I) is of at least 99.8 percent purity.

Various norbornene alkanols of formula (II) can be employed to form the corresponding silyl ethers of formula (I) by suitably employing various silanes of formula (III). In some embodiments the compound of formula (II) employed is having n equals 1, each of $R_1$, $R_2$ and $R_3$ is hydrogen, $R_4$ is methyl and each of $R_5$ and $R_6$ is phenyl.

Generally, the process of this invention is carried out under an inert atmosphere. Any of the known inert atmospheres can be employed herein. In some embodiments the inert atmosphere used is nitrogen. Other inert atmosphere that can be employed include helium or argon.

Surprisingly, it has now been found that the equimolar mixture of a compound of formula (II) and a compound of formula (III) is added to a solution of tris(pentafluorophenyl)borane at a moderately low temperature to form the compound of formula (I). Tris(pentafluorophenyl)-borane can be dissolved in any of the inert solvents. Suitable such solvents include hydrocarbon solvents, such as hexane, heptane, petroleum ether, benzene, toluene, xylene, and the like, halohydrocarbon solvents, such as dichloromethane, 1,1-dichloroethane, chloroform, carbon tetrachloride, and the like, including mixtures in any combination thereof. In some embodiments the solvent used is toluene.

As noted, generally, the compounds of formula (II) and the compounds of formula (III) employed are in the equimolar ratio. However, various other molar ratios that may produce higher yields of compound of formula (I) can also be employed as is well appreciated by those skilled in the art. Accordingly, in some embodiments slight excess of a compound of formula (III) is employed. For example, 5 to 10 mole percent excess use of compound of formula (III) seems to provide higher yield of compound of formula (I).

As depicted in Scheme I, in accordance with the process of this invention, an approximately equimolar mixture of a compound of formula (II) and a compound of formula (III) is slowly added to a stirred solution of tris(pentafluorophenyl)borane under inert atmospheric conditions to form a compound of formula (I) with a simultaneous generation of hydrogen. The reaction can be carried out suitably at moderately elevated temperatures than the room temperature. For example, such reactions can be carried out in a suitable reactor system at a temperature range of from about 40° C. to about 90° C. In some other embodiments, the reaction can be carried out at a temperature range of from about 50° C. to about 80° C.; and in some other embodiments the reaction can be carried out at a temperature range of from about 60° C. to about 70° C.; and yet in some other embodiments at a temperature of about 65° C. In some other embodiments the reaction can be carried out at a temperature higher than about 90° C.

Generally, the reaction of the compound of formula (II) with the compound of formula (III) is exothermic in the presence of tris(pentafluorophenyl)borane, and therefore, the addition of the reactants is carried out in a controlled order. The mixture is generally added slowly over a period of one hour or more. In some embodiments the addition of the mixture is conducted over a period of from about 10 minutes to 120 minutes. In some other embodiments the addition of the mixture can be longer than 120 minutes as is appreciated by one of skill in the art. After the addition of the mixture it is generally beneficial to carry out the reaction for an additional period of about 10 minutes or 20 minutes or longer. Suitable reactor systems include but are not limited to vented glass reactor, suitable vessels and/or reactors constructed of glass, glass-lined metal, and the like.

After completion of the reaction, it is very important that all of the residual catalyst, tris(pentafluorophenyl)borane, is removed from the reaction mixture. Advantageously, it has now been found that treating the reaction mixture with suitable base it is now possible to remove essentially all of the remaining tris(pentafluorophenyl)borane. Suitable base include but not limited to alkaline metal base, e.g., lithium, sodium, potassium or cesium hydroxide, alkoxide, carbonate, bicarbonate, and the like; an alkaline earth metal base, e.g., calcium or magnesium hydroxide, alkoxide, carbonate, bicarbonate and the like, and suitable inorganic or organic base, e.g., ammonia, trialkylamine, imidazole, pyridine, and the like. Specific alkali bases include but not limited to lithium hydroxide, lithium methoxide, lithium ethoxide, lithium tert-butoxide, lithium carbonate, lithium bicarbonate, sodium hydroxide, sodium methoxide, sodium ethoxide, sodium tert-butoxide, sodium carbonate, sodium bicarbonate, potassium hydroxide, potassium methoxide, potassium ethoxide, potassium tert-butoxide, potassium carbonate, potassium bicarbonate, cesium hydroxide, cesium methoxide, cesium ethoxide, cesium tert-butoxide, cesium carbonate, cesium bicarbonate, calcium hydroxide, calcium methoxide, calcium ethoxide, calcium tert-butoxide, calcium carbonate, calcium bicarbonate, magnesium hydroxide, magnesium methoxide, magnesium ethoxide, magnesium tert-butoxide, magnesium carbonate, magnesium bicarbonate, ammonia, trimethylamine, triethylamine, imidazole, and any combination of mixtures thereof. In some embodiment the base employed to remove tris(pentafluorophenyl)borane is sodium carbonate in the form of an aqueous solution.

Generally, the progress of the reaction can be monitored by removing aliquots from the reactor and analyzing by suitable methods such as thin layer chromatography (TLC), gas chromatography (GC), liquid chromatography (LC) or high performance liquid chromatography (HPLC), or a combination of GC/mass spectroscopy (MS), LC/MS, among other known techniques.

Various norbornene alkanols of formula (II) as described herein are well known in the art or can be readily made by the methods known in the art. For example, U.S. Pat. No. 9,382,271 B2 discloses a process for the preparation of high purity norbornene alkanols, pertinent portions of which are incorporated herein by reference.

The reaction mixture is isolated after treatment with aqueous sodium carbonate and then subjected distillation. It has now been found that it is advantageous to remove volatile organics, such as the solvent (e.g., toluene) present in the resulting product mixture at relatively lower temperature and vacuum conditions. Accordingly, in some embodiments the resulting product mixture is subjected to distillation at a temperature of from about 130° C. to 160° C. and at 100 to 200 Torr. Next the product is subjected to vacuum distillation at a temperature of from about 160° C. to 170° C. and at 1 to 2 Torr to obtain the compound of formula (I) of very high purity as described herein.

Surprisingly, it should further be noted that by practice of the process of this invention it is now possible to obtain a compound of formula (I) which is essentially free of any boron remaining from the catalyst employed. Accordingly, in some embodiments the amount of boron present in the compound of formula (I) is less than 5 ppm, less than 4 ppm, less than 3 ppm, less than 2 ppm, less than 1 ppm. In some other embodiments the amount of boron present in the compound of formula (I) is from about 1 ppm to 2 ppm. It is imperative that the compound of formula (I) is not only of high purity but also free of boron as it is used as a monomer in the preparation of high quality polymers as is shown by the specific examples that follow.

In another embodiment of this invention there is further provide a process for the preparation of a compound of formula (I) as described herein, which is comprising:

placing a solution of tris(pentafluorophenyl)borane in toluene in a suitable reactor under nitrogen atmosphere;

adding to the above solution a stoichiometric amounts of a compound of formula (II) as described herein and a silane of formula (III) as described herein over a period of about 120 minutes at a temperature from about 60° C. to about 70° C.;

allowing the reaction mixture to completely react for an additional period of about 15 minutes to about 30 minutes;

cooling the reaction mixture to room temperature and treating with sodium carbonate; and removing toluene by vacuum distillation at a temperature of about 130° C. and 100 to 200 Torr; and vacuum distilling at a temperature from about 160° C. to 170° C. and below 1 Torr to obtain the compound of formula (I) of at least 99 percent purity and boron residue less than about 5 ppm.

In another embodiment of this invention there is also provided a process for the preparation of (bicyclo[2.2.1]hept-5-en-2-ylmethoxy)(methyl)-diphenylsilane of formula (IB):

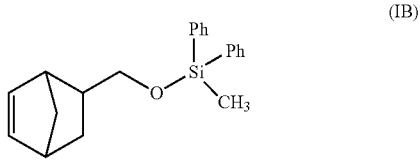 [SMILES: C[Si](OCC1CC2C=CC1C2)(c1ccccc1)c1ccccc1]

comprising:
placing a solution of tris(pentafluorophenyl)borane in toluene in a suitable reactor under nitrogen atmosphere;
adding to the above solution an equimolar amounts of norbornene methanol (IIB):

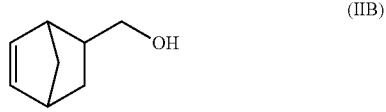

and methyldiphenylsilane (IIIB):

over a period of about 100 minutes to about 120 minutes;
allowing the reaction mixture to react for an additional period of about 20 minutes;
cooling the reaction mixture to room temperature and treating with sodium carbonate; and
removing the toluene by evaporation; and
distilling under vacuum to obtain (bicyclo[2.2.1]hept-5-en-2-ylmethoxy)(methyl)-diphenylsilane of formula (IB) of at least 99 percent purity and boron residue less than about 2 ppm. In another embodiment of the process of this invention the purity of (bicyclo[2.2.1]hept-5-en-2-ylmethoxy)(methyl)diphenylsilane is at least 99.8 percent and boron residue is less than about 1 ppm.

This invention is further illustrated by the following examples which are provided for illustration purposes and in no way limit the scope of the present invention.

EXAMPLES (GENERAL)

The following abbreviations have been used hereinbefore and hereafter in describing some of the compounds, instruments and/or methods employed to illustrate certain of the embodiments of this invention:
NBMeOH—norbornene methanol; DPMS—diphenylmethylsilane; FAB—tris(pentafluorophenyl)borane; Pd-1206—acetonitrile)bis(triisopropylphosphine)-palladium(acetate)tetrakis(pentafluorophenyl)borate; DANFABA—dimethylanilinium tetrakis(pentafluorophenyl)borate; EA—ethyl acetate; GC-FID—gas chromatography-flame ionization detector; GPC-gel permeation chromatography; $M_W$—weight average molecular weight; PDI—polydispersity index.

Example 1

NBMeOSiPh$_2$Me-(bicyclo[2.2.1]hept-5-en-2-ylmethoxy)(methyl)diphenylsilane

In an appropriately sized agitated reactor was placed a solution of FAB (0.98 g) in toluene (2930 mL). The reactor was then sealed, filled with nitrogen and pressure tested. The reactor was operated in a vented mode with a high nitrogen flow on the vent system. The reactor was heated to 65° C. Once at temperature, a mixture of NBMeOH (584 g) and DPMS (971 g) were metered into the reactor (over 100 minutes) generating hydrogen and the title compound. Once metering was complete, the reaction mixture was maintained at this temperature for 20 minutes and then cooled to ambient temperature (~25° C.). To the cooled reaction mixture, a solution of sodium carbonate (4100 g, 2.5 wt %) was added and stirred for 30 minutes. The layers were allowed to settle for ~30-45 minutes and the bottom aqueous layer was decanted and discarded. The process was repeated twice with deionized water (4100 g). Then the volatile organics (mostly toluene) were removed under vacuum (~100 Torr and 160° C.).

The resulting title compound was then purified using shortpath wiped film evaporator vacuum distillation. The first distillation pass at 130° C. and ~1 Torr removed light impurities (~5% by weight). The second distillation pass at 164° C. and ~1 Torr resulted in the title compound (~85% recovery). The purity of the title compound was >99% as determined by GC FID and yield. The residual boron (from FAB) was ~1 ppm.

The polymerization of the title compound resulted in high quality polymer as demonstrated below.

Copolymerization of Title Compound from Example 1

To a 40-mL vial, toluene (15 mL), hexyl norbornene (0.8 g), title compound from Example 1 (1.5 g), and 1-hexene (0.2 g) were charged and heated to 80° C. A catalyst solution of Pd-1206 (0.00044 g) and DANFABA (0.00029 g) in 0.1 mL of anhydrous EA was then added to the reaction mixture initiating polymerization. After 35 minutes, an additional portion of 0.2 g of hexyl norbornene dissolved in 0.4 mL of toluene was added. After 3.5 hours, the resulting polymer conversion was 82%. The molecular weight of the polymer was determined by GPC; $M_W$—156,000 and PDI—3.1.

Comparative Example 1

NBMeOSiPh$_2$Me-(bicyclo[2.2.1]hept-5-en-2-ylmethoxy)(methyl)diphenylsilane

In an appropriately sized agitated reactor were placed a solution of FAB (0.98 g) in toluene (2900 mL). The reactor was then sealed, filled with nitrogen, and pressure tested. The reactor was then operated in a vented mode with a high nitrogen flow on the vent system. The reactor was then heated to 65° C. A mixture of NBMeOH (584 g) and DPMS (971 g) was metered into the reactor (over 100 minutes) generating hydrogen and the title compound. Once metering was complete, the mixture was allowed to react for an additional period of 20 minutes maintaining the reaction temperature at 65° C. Then pyridine (26 g) was added via closed transfer to deactivate FAB and the contents were cooled and discharged via closed transfer. Then volatile organics (mostly toluene) were removed under vacuum stripping (~100 Torr and 160° C.).

The resulting crude title compound was then purified using shortpath wiped film evaporator vacuum distillation. The first distillation pass at 130° C. and ~1 Torr further removed remaining light impurities (~5% by weight). The second distillation pass at 164° C. and ~1 Torr resulted in the title compound (~85% recovery). The purity of the title compound was >99% as determined by GC FID. The residual boron (from FAB) was ~12 ppm.

The following example demonstrates that the title compound as produced in Comparative Example 1 produces inferior quality copolymer in low conversions.

Copolymerization of the Title Compound of Comparative Example 1

To a 40-mL vial, toluene (15 mL), hexyl norbornene (0.8 g), NBMeOSiPh$_2$Me from Comparative Example 1 (1.5 g), and 1-hexene (0.2 g) were charged and heated to 80° C. A catalyst solution of Pd-1206 (0.00044 g) and DANFABA (0.00029 g) in 0.1 mL of anhydrous EA was then charged to the reaction mixture initiating polymerization. After 35 minutes, an additional portion of 0.2 g of hexyl norbornene dissolved in 0.4 mL of toluene was added. After 3.5 hours, the resulting polymer conversion was ~36%. The molecular weight of the polymer was determined by GPC; $M_W$—245,000 and PDI—2.1.

Comparative Example 2

NBMeOSiPh$_2$Me-(bicyclo[2.2.1]hept-5-en-2-yl-methoxy)(methyl)diphenylsilane

This Comparative Example 2 demonstrates that addition of reactants in any other order than described in the process of this invention results in low conversions and low purity of the title compound.

To an appropriately sized four neck round bottom flask equipped with thermometer inlet, a stirbar, N$_2$ needle inlet through a septum, gas outlet, oil bubbler, and a reflux condenser was charged with norbornene methanol NBMeOH (10 g), toluene (100 mL) followed by addition of FAB (0.82 g) as a 10 wt % solution in toluene (9 ml) under high N$_2$ flow. To this stirring solution was added dropwise diphenyl methyl silane (15.9 g) as a solution in toluene (80 mL) slowly to control gas evolution and exotherm (keeping the temperature below 50° C.). After addition is complete (~1 h) the reaction mixture stirred for 18 h.

The reaction mixture was then filtered through a silica-gel plug (10 cm diameter×2.5 cm high). The silica gel plug was washed with toluene (100 mL×2) and the residual wash solvent from the silica-gel cake was checked by TLC to ensure that no more target product was still eluting off the plug. The resulting solution was concentrated to a small volume and 8.9 g (34% yield) of target material was isolated without further purification as a colorless liquid.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A process for the preparation of a compound of formula (I):

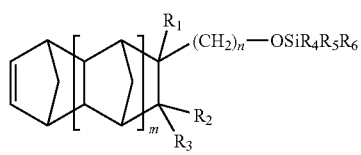

wherein n is an integer from 1 to 10, inclusive, and where one or more of CH$_2$ is optionally substituted with (C$_1$-C$_{10}$) alkyl or (C$_1$-C$_{10}$) perfluoroalkyl;

m is an integer from 0 to 2, inclusive;

R$_1$, R$_2$ and R$_3$ are the same or different and independently of each other selected from the group consisting of hydrogen, halogen, methyl, ethyl, linear or branched (C$_3$-C$_{12}$)alkyl, (C$_3$-C$_{12}$)cycloalkyl, (C$_6$-C$_{12}$) bicycloalkyl, (C$_7$-C$_{14}$)tricycloalkyl, (C$_6$-C$_{10}$) aryl, (C$_6$-C$_{10}$) aryl (C$_1$-C$_3$)alkyl, (C$_5$-C$_{10}$) heteroaryl, (C$_5$-C$_{10}$) heteroaryl (C$_1$-C$_3$)alkyl, (C$_1$-C$_{12}$)alkoxy, (C$_3$-C$_{12}$)cycloalkoxy, (C$_6$-C$_{12}$) bicycloalkoxy, (C$_7$-C$_{14}$)tricycloalkoxy, (C$_6$-C$_{10}$) aryloxy (C$_1$-C$_3$)alkyl, (C$_5$-C$_{10}$) heteroaryloxy (C$_1$-C$_3$)alkyl, (C$_6$-C$_{10}$) aryloxy, (C$_5$-C$_{10}$) heteroaryloxy and (C$_1$-C$_6$) acyloxy;

R$_4$, R$_5$ and R$_6$ are the same or different and independently of each other selected from the group consisting of methyl, ethyl or linear or branched (C$_3$-C$_{12}$)alkyl and substituted or unsubstituted (C$_6$-C$_{14}$) aryl;

comprising:

placing a solution of tris(pentafluorophenyl) borane in a suitable reactor under inert atmosphere;

adding to the above solution a mixture of a compound of formula (II):

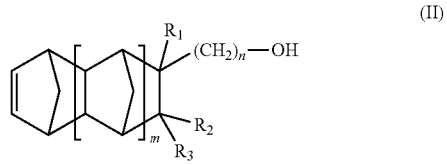

and a silane of formula (III):

over a period of 10 minutes to 120 minutes at a temperature from 25° C. to 80° C.;

allowing the reaction mixture to react for an additional period of 15 minutes to 120 minutes;

cooling the reaction mixture to room temperature and treating with a suitable base selected from the group consisting of lithium carbonate, lithium bicarbonate, sodium carbonate, sodium bicarbonate, potassium carbonate, potassium bicarbonate, ammonium hydroxide, tetramethyl ammonium hydroxide and pyridine; and distilling the reaction mixture under vacuum at a temperature of from 130° C. to 170° C. to obtain the compound of formula (I); and wherein the amount of tris(pentafluorophenyl) borane employed is less than or equal to 0.2 mole percent based on moles of the compound of formula (II) employed.

2. The process of claim 1, wherein the compound of formula (I) is of at least 99 percent purity.

3. The process of claim 1, wherein the compound of formula (I) is of at least 99.5 percent purity.

4. The process of claim 1, wherein the compound of formula (I) is of at least 99.8 percent purity.

5. The process of claim 1, wherein n is 1, each of R$_1$, R$_2$ and R$_3$ is hydrogen, R$_4$ is methyl and each of R$_5$ and R$_6$ is phenyl.

6. The process of claim 1, wherein tris(pentafluorophenyl) borane is present in catalytic amounts from 0.05 mole percent to 0.1 mole percent based on the moles of the compound of formula (II) employed.

7. The process of claim 1, wherein the amount of tris(pentafluorophenyl) borane used is less than 0.1 mole percent based on the moles of a compound of formula (II) employed.

8. The process of claim 1, wherein the amount of tris(pentafluorophenyl) borane used is from 0.1 mole percent to 0.2 mole percent based on the moles of a compound of formula (II) employed.

9. The process of claim 1, wherein the inert atmosphere is nitrogen.

10. The process of claim 1, wherein tris(pentafluorophenyl) borane is dissolved in toluene.

11. A process for the preparation of (bicyclo[2.2.1]hept-5-en-2-ylmethoxy)(methyl)-diphenylsilane of formula (IB):

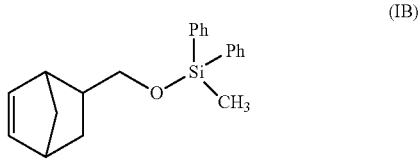 [SMILES: C[Si](OCC1CC2C=CC1C2)(c1ccccc1)c1ccccc1]

(IB)

comprising:

placing a solution of tris(pentafluorophenyl) borane in toluene in a suitable reactor under nitrogen atmosphere; adding to the above solution an equimolar amounts of norbornene methanol (IIB):

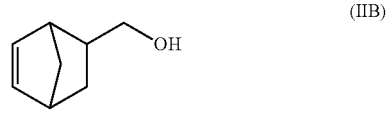

(IIB)

and methyldiphenylsilane (IIIB):

(IIIB)

over a period of 100 minutes to 120 minutes;

allowing the reaction mixture to react for an additional period of 20 minutes;

cooling the reaction mixture to room temperature and treating with sodium carbonate; and removing the toluene by evaporation; and distilling under vacuum to obtain (bicyclo[2.2.1]hept-5-en-2-ylmethoxy)(methyl)-diphenylsilane of formula (IB) of at least 99 percent purity and boron residue less than 2 ppm.

12. The process of claim 11, wherein the purity of (bicyclo[2.2.1]hept-5-en-2-ylmethoxy)-(methyl)diphenylsilane is at least 99.8 percent and boron residue less than 1 ppm.

* * * * *